United States Patent Office 3,010,948
Patented Nov. 28, 1961

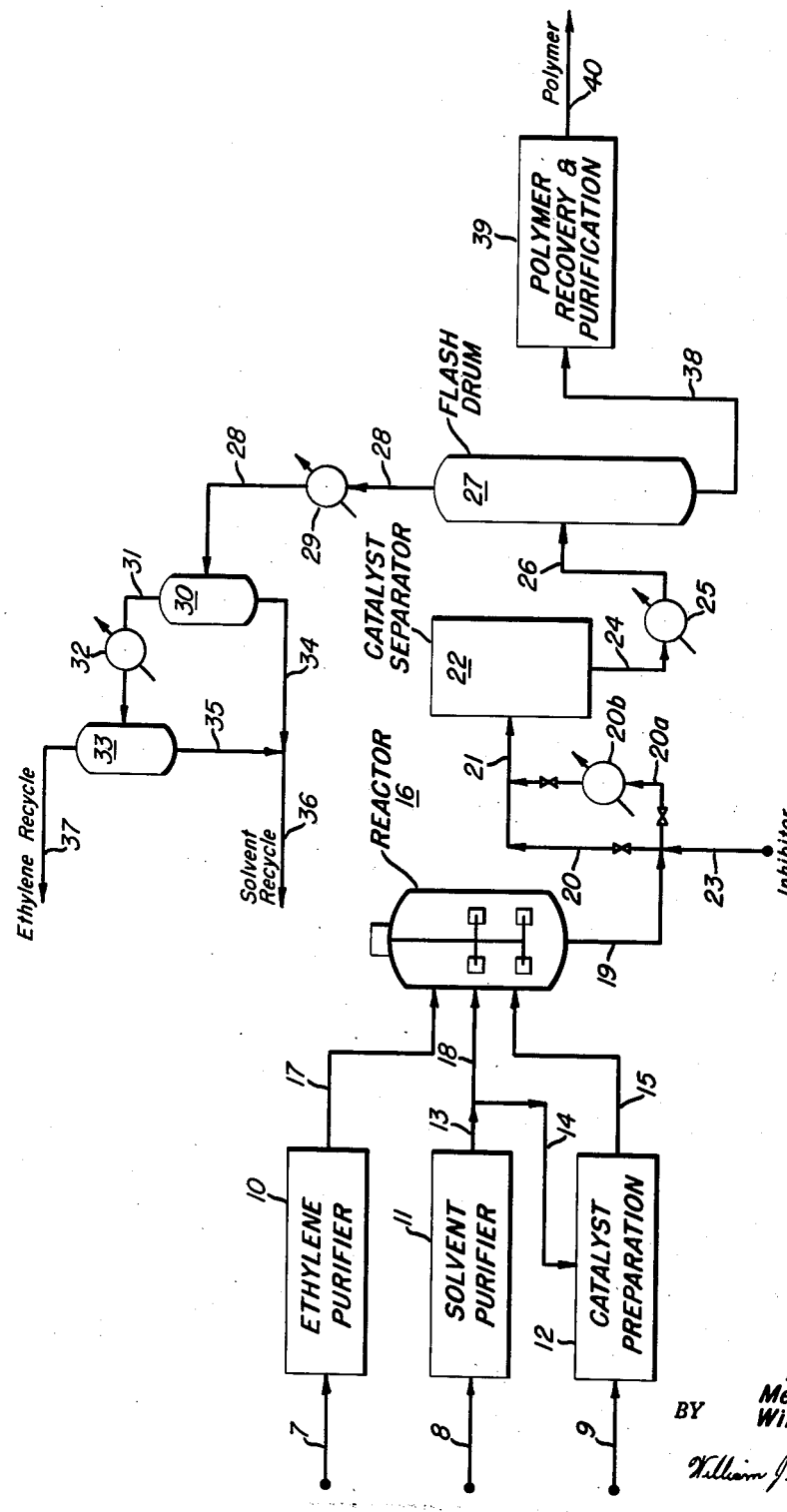
INVENTORS:
Edmund Field
Melvern C. Hoff
William Resnick
BY William J. Birmingham
ATTORNEY

3,010,948
CATALYST REMOVAL IN 1-ALKENE
POLYMERIZATION PROCESS
Edmund Field, Chicago, Ill., Melvern C. Hoff, Highland, Ind., and William Resnick, Chicago, Ill., assignors to Standard Oil Company, Chicago, Ill., a corporation of Indiana
Filed Dec. 31, 1958, Ser. No. 784,182
10 Claims. (Cl. 260—88.2)

This invention relates to polymerization of normally-gaseous 1-alkenes in a liquid medium with heterogeneous catalysts to produce a solution of a normally-solid polymer and dissolved 1-alkene, and more particularly, to the improvement wherein a polymerization inhibitor is added to the solution so that catalyst can be readily removed therefrom under polymerization conditions.

The present invention is specific to polymerization processes employing solution polymerization conditions. In such processes a normally-gaseous 1-alkene, e.g., ethylene and/or propylene dissolved in a liquid medium, e.g., a hydrocarbon oil, is contacted in the presence of a heterogeneous catalyst to produce a solution of normally-solid polymer of said 1-alkene and dissolved 1-alkene. A particularly-difficult process problem encountered at this point is the removal of catalyst particles from the polymer solution. To achieve substantially-complete removal of catalyst particles at high removal rates by liquid-solid separation techniques such as filtration, the solution should have as low a viscosity as possible. Low viscosity is favored by operating at elevated temperature, e.g., temperatures in the 1-alkene polymerization range, and by retaining the 1-alkene in the solution during catalyst removal.

Retention of the 1-alkene in the solution at polymerization conditions leads to a number of process difficulties. For example, it results in additional polymerization of 1-alkene, bringing about undesired variations in product quality and/or catalyst separation difficulties, particularly plugging of filters. Specifically, if temperature in the catalyst separation step differs from the particular reaction temperature employed during the reaction step, the additional polymer formed differs in molecular weight from that desired, for example, lower temperatures resulting in higher molecular weight polymers. Moreover, it would be difficult to control conditions during the separation step at reaction temperature because the polymerization reaction is exothermic and a filter or centrifuge, as contrasted to a reactor, does not lend itself to fine temperature control. Poor temperature control may possibly lead to thermal degradation of polymer. Furthermore, polymer formed during catalyst separation tends to agglomerate with catalyst particles, thereby causing separation difficulties.

It is therefore an object of the present invention to remove catalyst particles from a 1-alkene polymer solution at high removal rates. It is another object of the present invention to separate catalyst from a catalyst-containing solution of dissolved 1-alkene, polymerized 1-alkene, and solvent at polymerization conditions without encountering the aforementioned difficulties. These and other objects of the present invention will become apparent as the detailed description thereof proceeds.

It has now been discovered that solid catalyst particles can be removal from solutions of normally-solid 1-alkene polymers at high removal rates by retaining the 1-alkene in the solution, in contrast to prior flashing of the 1-alkene, by adding a polymerization inhibitor to the solution, and by filtering and/or centrifuging the inhibited solution at polymerization conditions. Once the catalyst particles have been removed, the polymer product can be readily recovered from the solution by, for example, flashing substantially all of the 1-alkene and at least a substantial proportion of the solvent from the solution, and by removing any residual solvent and/or grease from the polymer by polymer-recovery techniques of the art.

As previously indicated, it is an essential feature of the present invention that solution polymerization conditions be employed, i.e., temperature and pressure during reaction are such that both unreacted 1-alkene and polymerized 1-alkene remain dissolved in the solvent. The particular temperature and pressure selected within solution polymerization conditions depend upon a number of factors including the particular catalyst system employed and the optimum conditions for such system within solution polymerization conditions, the particular 1-alkene being polymerized, the particular solvent selected, and the like. In general, however, a temperature of at least about 300° F. is employed in all cases. For example, when polymerizing ethylene with a sodium-promoted molybdena-on-alumina catalyst with purified n-decane as solvent, a temperature of about 450–570° F. and a pressure of about 800–1200 p.s.i.g. may be employed. Similarly, when polymerizing ethylene with unpromoted chromia-on-silica-alumina catalyst with purified methyl cyclohexane as solvent, a temperature of 300–350° F. and a pressure of 400–600 p.s.i.g. may be employed.

While, as above indicated, the present invention is specific to solution polymerization conditions, it is otherwise applicable to various solid catalyst systems effective for polymerizing 1-alkenes, particularly ethylene, propylene and mixtures thereof. Specifically, the improvement is applicable to heterogeneous catalysts comprising essentially a compound of a transition metal selected from the subgroups 4, 5, and 6 of the periodic system. The catalysts may be preformed solid catalysts, promoted preformed solid catalysts, precipitated solid catalysts, or pretreated precipitated solid catalysts. ("Solid Polymers From Surface Catalysts," by Friedlander and Resnick, "Advances in Petroleum Chemistry and Refining," volume 1, pages 526–570, copyright 1958 by Interscience Publishers, Inc., New York.)

In the preformed solid catalyst system, various metal oxides on high surface supports are employed, preferably molybdenum oxide, cobalt-molybdate, or other metal molybdates supported on high surface gamma-alumina. The catalyst is activated by partial reduction with reducing gases, e.g., hydrogen, carbon monoxide, or the like. Oxides of other metals, e.g., magnesium, nickel, zinc, chromium, vanadium, or thorium can be present in proportions up to about 10 weight percent of the total catalyst. Other high surface supports, e.g., titania, zirconia, or the like, can also be used. Other preformed catalysts include chromium oxide on various supports, e.g., silica, alumina, zirconia, thoria, or mixture thereof, preferably silica-alumina. The chromium-oxide catalysts are activated by treating with dry air at atmospheric pressure. Chromium-oxide-on-silica-alumina can be promoted with small amounts of strontium oxide.

The preformed solid catalysts can be greatly promoted by active metals and hydrides. For example, catalytic activity of group VI metal oxides is promoted by alkali metals, alkali metal hydrides, alkaline earth metals, alkaline earth metal hydrides, metal borohydrides, metal aluminohydrides, or calcium, strontium or barium carbides. The promoting action of alkali metals may be increased by a small quantity of hydrogen halide or alkyd halide. The activity of group V metal oxides, e.g., vanadia, niobia, or the like, is promoted by alkaline earth hydrides, metal aluminohydrides, metal borohydrides, or metal alkyls. The activity of nickel or cobalt on charcoal is promoted by alkali metals or alkaline earth hydrides, such as calcium, barium, or magnesium hydrides.

The most important of the precipitated solid catalysts for ethylene polymerization are formed by the interaction of aluminum alkyls or aluminum sesquihalides with transition metal salts, such as titanium tetrachloride. The pretreated precipitated solid catalyst systems include the combination of a transition metal halide prereduced to a lower valence state and an active organometallic compound, such as aluminum trialkyl. Titanium trichloride, titanium dichloride, and vanadium trichloride are commonly used.

The solvent employed may be any substantially inert liquid, but it is preferably a hydrocarbon. Of the various hydrocarbon solvents, it is preferred to employ a paraffinic solvent containing an average of about 9 or 10 carbon atoms per molecule. Aromatic solvents such as benzene, toluene, or xylene may be used, but they tend to interfere with removal of trace color bodies or color-forming materials which may be produced during polymerization. Furthermore, aromatic solvents tend to become alkylated and converted into undesirable by-product materials such as "grease." Paraffins which are much-higher boiling than $C_{10}$ are more difficult to remove from polymer product. On the other hand, low-boiling paraffin solvents may result in the formation of two liquid phases and may require increased equipment costs. The paraffinic solvent may include cyclo-paraffins (naphthenes), and for practical purposes a narrow kerosene fraction boiling in the range of about 360 to 400° F. is usually suitable.

The particular polymerization inhibitor, which is added to the polymerization zone effluent, and the amount thereof depend in part on the particular catalyst system employed. Some inhibitors, however, can be used in a wide variety of the above-described catalyst systems. For example, water, carbon dioxide and/or oxygen inhibits the polymerization activity of preformed catalysts, e.g., chromia-on-silica-alumina, the promoted preformed catalysts, e.g., sodium-promoted molybdena-on-alumina, or the precipitated catalysts, e.g., aluminum trialkyl and titanium tetrachloride. Addition of water as an inhibitor may, however, lead to color difficulties in the polymer product. Various other inhibitors can alternatively be used. For example, in the case of sodium-promoted molybdena-on-alumina catalyst (and also precipitated catalysts) effective inhibitors have been found to include acetic acid, phenol, benzylamine, diethylamine, triethylamine, diphenylamine (but not triphenylamine), etc. Typically, about 0.01 to 5 moles of inhibitor is added per mole of sodium, a typical catalyst containing 0.02 mole of sodium per gram of molybdena-on-alumina. The particular inhibitor and the amount thereof is not, per se, part of the present invention.

The invention will become more clearly understood from the following detailed description of a particular embodiment read in conjunction with the accompanying figure, which forms a part of this specification and which is a simplified schematic flow diagram of a polyethylene process utilizing the present invention.

Referring to the figure, ethylene, solvent, and catalyst from sources 7, 8, and 9 respectively are charged to ethylene purifier 10, solvent purifier 11, and catalyst preparation zone 12 respectively. Ethylene purification may be effected, for example, by passing the ethylene through a caustic scrubber to remove carbon dioxide, a water scrubber to remove caustic, and a gas dryer to remove any traces of water. Any known type of purification system may be employed, but it is important that the ethylene be substantially free from oxygen (less than 50 and preferably less than 10 p.p.m.). Its moisture content should be at least low enough to correspond to a —50° F. dew point and it should be substantially free from CO and $CO_2$. While ethylene is the 1-alkene which is polymerized in this example, it should be understood that the invention is applicable to the polymerization of other 1-alkenes, e.g., propylene, normal butenes, and the like and/or mixtures thereof. It is, however, most advantageously applied to ethylene, propylene, and/or mixtures thereof.

Solvent, which in this example is a narrow kerosene fraction boiling in the range of 360 to 400° F. and is normally recycled for economy reasons, is purified in solvent purifier 11 by, for example, heart-cut distillation to remove heavy and light ends, by azeotropic distillation to remove water, and by passing the solvent through a bed packed with adsorbent, such as, charcoal, activated alumina, silica gel, synthetic zeolite of 4 angstrom pore openings, and/or the like, preferably silica gel. In this example, the catalyst is sodium-promoted molybdena-on-alumina which is slurried in catalyst preparation zone 12 with purified solvent introduced from solvent purifier 11 via lines 13 and 14. The sodium and molybdena-on-alumina may be dispersed separately into the purified solvent. Alternatively, the sodium may be dispersed on the surface of molybdena-on-alumina in the form of "high-surface sodium," which in turn may be dispersed in purified solvent.

The uniform slurry of catalyst and solvent is charged via line 15 to reactor 16. Similarly, purified ethylene is introduced from ethylene purifier 10 to reactor 16 via line 17 and purified solvent is introduced via lines 13 and 18. Alternatively (but not shown in the figure), the purified ethylene may be introduced directly into line 18 from line 17 and the resulting solution of ethylene in solvent introduced into reactor 16. Polymerization in reactor 16 may typically be effected at a temperature of about 480° F. and a pressure of about 1,000 p.s.i.g., corresponding to solution polymerization conditions.

Reactor 16 is provided with an impeller-type mixer to assure adequate contacting of dissolved ethylene with the finely-divided catalyst. In a batch-type reactor system a fine catalyst, e.g., up to 100 mesh (ASTM Designation E11–39, 1949), may be employed, preferably in the form of microspheres. In a continuous reactor system (and optionally in a batch-type reactor system) relatively large-size catalyst particles in the range of about 20–80 mesh maximizes retention of catalyst particles in the reactor, and subsequent polymer purification is thereby somewhat simplified. In such reactors, a screened baffle may be interposed at the polymer solution outlet in order to further maximize retention of the coarse catalyst in the reactor. A catalyst concentration in the reactor of the order of 10 weight percent or more, or approximately 0.7 pound per gallon of stirred reactor volume, is desirable although catalyst concentrations may be much lower or higher. Ethylene and solvent enter the reactor from lines 17 and 18 at about 400° F.; and as, above stated, the reactor is operated at about 450° F. and about 1,000 p.s.i.g.

Reactor effluent, which contains solvent, unreacted ethylene dissolved therein, dissolved polyethylene and catalyst particles, is withdrawn through line 19 and passes via lines 20 and 21 to catalyst separator zone 22. Alternatively, effluent from line 19 may be passed to catalyst separator 22 via line 20a and heat exchanger 20b if temperature of the effluent is to be adjusted prior to catalyst separation. Prior to entering catalyst separator 22 effluent from reactor 16, is inhibited in lines 20 or 20a by addition of an ethylene polymerization inhibitor from line 23. While, as previously stated, various polymerization inhibitors may be used, in this example the inhibitor is moist carbon dioxide which is introduced at the rate of about 0.1 mole per mole of sodium promoter in the effluent. The moist carbon dioxide effectively nullifies the sodium promoter so that the molybdena-on-alumina catalyst is essentially dead for polymerization.

Catalyst separator 22 may be a conventional liquid-solid separator, such as a filter or centrifuge or combination thereof, the effectiveness of which for catalyst separation is greatly enhanced by the very-low viscosity of the material entering catalyst separator 22 via line 21.

While very-low viscosity increases the effectiveness of centrifuges, the present invention is most advantageously employed in solving separation problems associated with filters, e.g., low-filter rates, filter plugging, and the like. The low viscosity is achieved by operating catalyst separator 22 under pressure conditions assuring retention of ethylene in solution and at elevated temperature. Conveniently these conditions are essentially the same as in reactor 16, in which case a pump (not shown) may be interposed between the reactor and catalyst separator. Catalyst separator 22 may also be operated at a slightly lower pressure than reactor 16 so as to facilitate the flow of effluent from reactor 16 to catalyst separator 22 without additional pumping. In such case, temperature in catalyst separator 22 may be lowered somewhat, if necessary, to prevent flashing of ethylene during catalyst separation.

Catalyst separator 22 may be a conventional centrifugal-type separator, e.g., a Merco centrifuge (registered trademark, Dorr-Oliver Incorporated, Stamford, Connecticut) or a conventional plate-and-frame filter (optionally with heated frames) employing paper (preferably high-wet-strength cellulosic type) or cloth filter media. Alternatively, catalyst separator 22 may be a Sparkler Filter (vertical or horizontal pressure leaf filter, Sparkler Manufacturing Company, Mundelein, Illinois) or a filter-aid precoat filter. If ordinary paper filters are employed in catalyst separator 22, temperature of the catalyst-containing solution entering catalyst separator 22 may have to be lowered sufficiently in heat exchanger 21b to at least the maximum tolerable temperature, e.g., about 400° F., that the paper can stand before effective destruction thereof as a filter medium.

Because of the addition of polymerization inhibitor from line 23, no further polymerization occurs in catalyst separator 22 even though it is operated at polymerization conditions. Thus, a very low viscosity is achieved with resultant very high separation rates without plugging or other separation difficulties caused by after-polymerization. Moreover, the temperature in catalyst separator 22 can be varied from reactor temperature, i.e., lowered or raised in heat exchanger 21b, without producing a different molecular weight polymer than that already produced in reactor 16. Thus, temperatures can be raised in catalyst separator 22 to increase separation rates still further (limited, of course, by polymer thermal-degradation considerations). A temperature rise of as little as 50–60° F. may as much as double filter rates. Temperature may also be lowered somewhat to permit use of a temperature-sensitive filter medium.

After removal of catalyst, the solution of ethylene, polymer, and solvent is charged via line 24, heat exchanger 25 and line 26 to flash zone 27, wherein substantially all of the ethylene and at least a substantial portion of the solvent are flashed overhead via line 28 and heat exchanger 29 to separator 30. Uncondensed gases and vapors are passed from separator 30 via line 31 and heat exchanger 32 to separator 33. Condensate from separator 30, i.e., solvent, is removed via line 34 and condensate from line 33, also solvent, is removed via line 35. This condensate is combined in line 36 and is ultimately recycled, along with makeup solvent, via line 8 to solvent purifier 11. Purification of recycled solvent is usually essential because of gradual degradation thereof during use. Overhead from separator 33, which is substantially-pure ethylene, is removed via line 37 and is also recycled but need not necessarily be repurified and thus can be introduced directly to line 17.

Bottoms from flash zone 27, which may be substantially pure polyethylene, but which also may optionally contain 5 to 25% solvent to facilitate pumping, are removed via line 38 and transferred to a polymer recovery and/or purification zone 39. Various techniques are available for recovery and/or purification, the particular finishing operations per se not being a part of the present invention. They may include steam distillation, gas stripping, vacuum extrusion, solvent (e.g., hexane) extraction, expression, pelletization and/or the like.

From the foregoing description it is evident that addition of polymerization inhibitor in accordance with the present invention results in improved operation and great simplification of the process. First and foremost, high catalyst-recovery rates are achieved in the catalyst separator without encountering plugging or other separation difficulties and without additional polymerization which may cause off-specification product and/or uncontrolled temperatures in the catalyst separator (from the exothermic nature of the reaction). In addition, the present invention permits great process simplification which results in substantial operating and investment savings. For example, only one operation, e.g., a single flashing operation, is required for simultaneous removal of both ethylene and solvent, whereas methods of the prior art usually employ at least two steps.

While the invention has been described by reference to a particular example thereof, it should be understood that the invention is also applicable to the use of other catalysts such as, for example, chromia-on-silica-alumina or titanium chloride-aluminum alkyl systems. Patentable novelty is not claimed in the catalyst compositions or reaction conditions per se since these are well known to those skilled in the art.

Having thus described the invention, what is claimed is:

1. A process which comprises (1) polymerizing a normally gaseous 1-alkene monomer in the presence of a preformed solid metal oxide catalyst selected from oxides of transition metals from the group consisting of groups V and VI of the periodic system at elevated temperature and pressure effective to produce a normally-solid polymer as a solute dissolved in a liquid reaction mixture comprising a substantially inert liquid solvent and a substantial amount of excess unreacted 1-alkene monomer, (2) introducing into said reaction mixture a small amount, effective to inhibit further polymerization, of carbon dioxide, and (3) separating the preformed solid metal oxide catalyst as a solid from said liquid reaction mixture, said separation being characterized by effecting it at elevated pressure to retain said excess 1-alkene monomer in the liquid phase, and by effecting it at elevated temperature, to maintain a low viscosity of said liquid reaction mixture.

2. Process of claim 1 wherein said 1-alkene is ethylene.
3. Process of claim 1 wherein said 1-alkene is propylene.
4. Process of claim 1 wherein said 1-alkene is a mixture of ethylene and propylene.
5. Process of claim 1 wherein said metal oxide is chromia.
6. Process of claim 1 wherein said metal oxide is molybdena.
7. Process of claim 1 wherein a catalyst promoter is present in the reaction mixture.
8. Process of claim 1 wherein said carbon dioxide is moist carbon dioxide.
9. Process of claim 1 wherein said separation is effected with a filter.
10. Process of claim 1 wherein said separation is effected with a centrifuge.

References Cited in the file of this patent

UNITED STATES PATENTS

| | | |
|---|---|---|
| 2,825,721 | Hogan et al. | Mar. 4, 1958 |
| 2,827,447 | Nowlin et al. | Mar. 18, 1958 |
| 2,845,412 | Heyson | July 29, 1958 |
| 2,886,561 | Reynolds et al. | May 12, 1959 |
| 2,890,214 | Brightbill et al. | June 9, 1959 |